United States Patent [19]
Readyhough

[11] 3,983,995
[45] Oct. 5, 1976

[54] NAIL HAVING FOUR OUTWARDLY DIVERGING HEAD ELEMENTS SHAPED TO PROVIDE PACKAGING, DRIVING AND FASTENING EFFECTIVENESS AND PACKAGE THEREOF

[75] Inventor: Peter A. Readyhough, Barrington, R.I.

[73] Assignee: Textron, Inc., Providence, R.I.

[22] Filed: Apr. 25, 1975

[21] Appl. No.: 571,559

Related U.S. Application Data

[60] Continuation of Ser. No. 284,077, Aug. 28, 1972, abandoned, which is a division of Ser. No. 888,383, Dec. 29, 1969, Pat. No. 3,696,701.

[52] U.S. Cl. .................................. 206/343; 85/28
[51] Int. Cl.² .................. B65D 85/24; F16B 15/02; F16B 15/08
[58] Field of Search ................. 206/343, 344, 345; 85/28; D8/271

[56] References Cited
UNITED STATES PATENTS

| | | | |
|---|---|---|---|
| 2,940,081 | 6/1960 | Juilfs | 206/343 |
| 3,162,871 | 12/1964 | Powers | 206/343 X |

FOREIGN PATENTS OR APPLICATIONS

| | | | |
|---|---|---|---|
| 719,874 | 11/1931 | France | 85/28 |
| 24,908 | 11/1898 | United Kingdom | |
| 272,143 | 6/1927 | United Kingdom | 85/28 |

Primary Examiner—Leonard Summer
Attorney, Agent, or Firm—Cushman, Darby & Cushman

[57] ABSTRACT

A nail constructed with four head elements extending generally radially outwardly from one end of an elongated substantially cylindrical shank. The head elements are shaped to permit a multiplicity of such nails to be packaged in correspondingly head oriented parallel relation with the shanks of adjacent nails disposed in substantial abutting engagement and with the leading two head elements of each nail in overlapping relation with the trailing two head elements of the forwardly adjacent nail. The head elements are also shaped so that when the nail is driven into a workpiece at least a portion of the head elements will extend across the grain of a wood workpiece irrespective of the orientation of the head elements with respect to the workpiece. The head elements are also shaped so that the nail can be driven from a package of such nails with a fastener driving tool in such a way that guiding contact with the shank in all four transverse component directions can be maintained substantially throughout the longitudinal driving movement of the nail and the driving movement can be accomplished by a fastener driving element having a size and shape at least equal to the shank and disposed in alignment therewith without head interference from the next adjacent nail of the package.

2 Claims, 3 Drawing Figures

U.S. Patent  Oct. 5, 1976  3,983,995
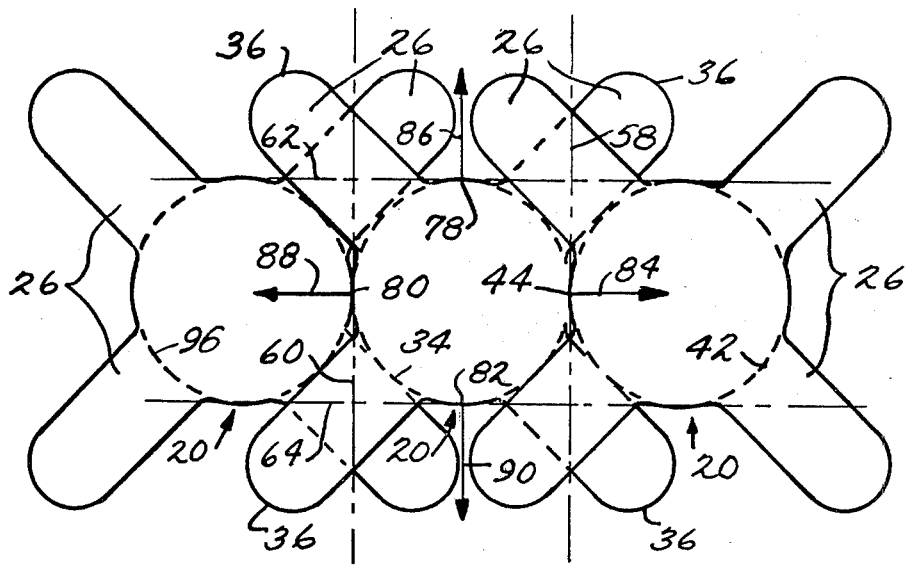
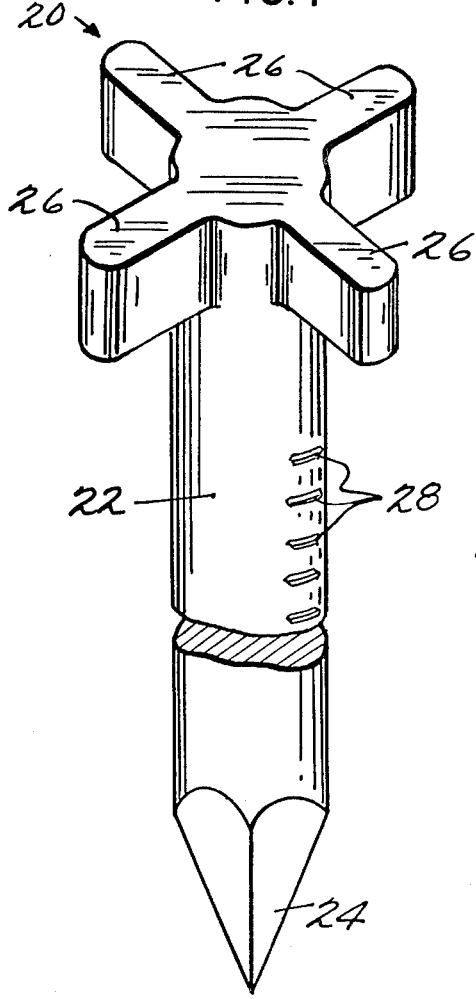
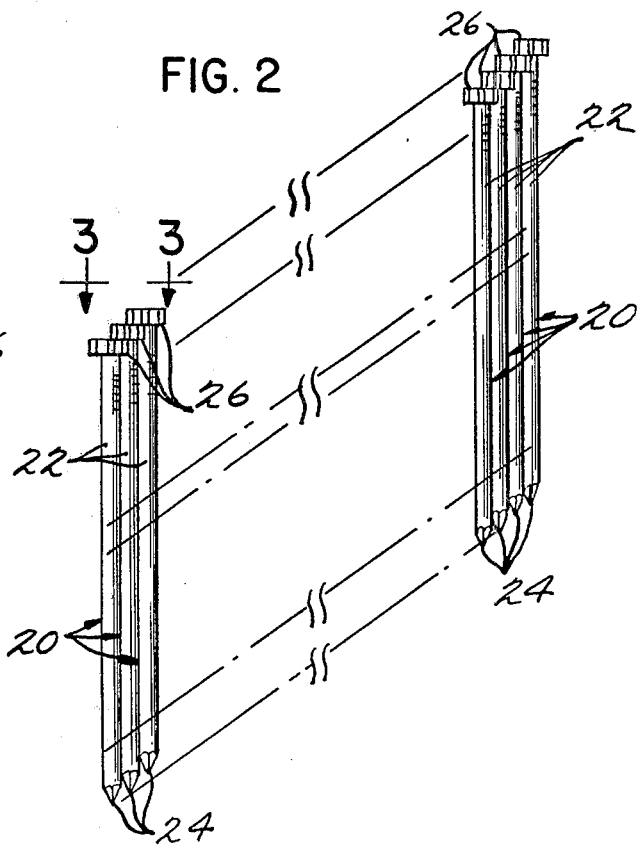

NAIL HAVING FOUR OUTWARDLY DIVERGING HEAD ELEMENTS SHAPED TO PROVIDE PACKAGING, DRIVING AND FASTENING EFFECTIVENESS AND PACKAGE THEREOF

This is a continuation of application Ser. No. 284,077 filed Aug. 28, 1972, now abandoned, which is a division of application Ser. No. 888,383, filed Dec. 29, 1969, which issued Oct. 10, 1972 as U.S. Pat. No. 3,696,701.

This invention relates to nails and more particularly to nails of the type adapted to be packaged for handling and loading within a magazine of a fastener driving device so as to be driven in response to the actuation of such device and to the packaging of such nails.

The construction of nails is an old and well-known art. Various suggested standards for the construction of nails have been proposed for many years. Over the years there have been many devices proposed with the capability of driving successive nails from a magazine containing a supply of nails. Within the last several decades devices of this type have received considerable commercial acceptance. Some devices of this type have magazine constructions which are capable of handling the supply of nails in loose bulk form. In general, however, the more commercially acceptable portable devices of this type have magazine constructions which are capable of accommodating a supply of nails only when packaged in a predetermined configuration, such as straight sticks or coils.

In general, the nails embodied in such packages are constructed in accordance with long existing standards. Nails constructed in accordance with these standards impose certain limitations upon the nature of the package itself, the equipment used in forming the package, and the nail driving device within which the package is to be used.

In general, two types of nails have been commercially packaged for use in fastener driving devices. One, round head nails; and two, T nails. Each of these two general types of nail constructions has different advantages and disadvantages in terms of the effectiveness of the package, the fastening effectiveness when driven, and the effectiveness of the driving action within the nail driving tool. In general, it can be stated that T nails can be more effectively packaged than round head nails but suffer in comparison with round head nails in terms of fastening effectiveness. While both T nails and round head nails have disadvantages from a standpoint of driving effectiveness within a fastener driving tool, T nails are somewhat more effective in their driving action than round head nails.

From the standpoint of packaging, the reason a T nail is more effective than a round head nail is that a much more dense package of T nails can be constructed than is the case with round head nails. This is because T nails can be aligned in row formation with their shanks in parallel abutting relation without head interference. Round head nails when positioned in parallel row formation must have their shanks spaced apart a distance sufficient to accommodate the outwardly extending circular head. The ability to position T nails in shank-to-shank abutting relation not only provides for optimum package density but permits simpler and more economical securement of the nails into the package. For example, T nails can be packaged in straight stick formation in a manner similar to staple sticks so that they can be maintained in such formation merely by the application of a suitable adhesive. On the other hand, where the shanks must be spaced apart to accommodate head clearance as with round head nails, not only is the density of the package diminished but considerable more difficulty is encountered in securing the shanks in spaced relation in a package.

These packaging disadvantages of full round head nails have not been completely overcome. There are generally two types of round head nail packages commercially available: one, straight stick packages; and two, coil packages. In straight stick packages the full round head nails are usually positioned in a row formation with their shanks in parallel relation and with the leading portion of each head overlapping the trailing portion of the adjacent head. With this relationship, the density of the package is reduced by as much as one-half or more with respect to a comparable T nail package. Likewise, the problem of securing the nails in this relationship have not been entirely solved. One method of securement involves the utilization of a plastic adhesive material, such as polyvinyl chloride, in the spaces between the nails, but this method of securement suffers from the disadvantage of the necessity to dispose of too much waste material during the driving action. Another method of securement is to utilize two adhesive tape strips on opposite sides of the row formation which contact the shanks tangentially. This method alleviates the waste problem somewhat but suffers from the disadvantage of insufficient holding ability, particularly during the driving action, resulting in nail misalignment and jamming conditions.

A coiled round head nail package is even less dense on a per unit length basis than a straight stick round head nail package for the reason that the heads are usually disposed in alignment, rather than being overlapped. However, the density problem is alleviated somewhat by the coiled configuration of the package. Nevertheless, the problems of package securement are increased and considerable cost and maintenance in the tool results from the necessity of a much more complex magazine assembly for handling and feeding the coil package within the tool.

Notwithstanding the packaging problems which are presented with respect to round head nails, there is a considerably greater usage of these packages than T nail packages ostensibly for the reason that a full round head has a much more favorable holding or fastening effectiveness in a wider range of applications than the straight head of a T nail. While perhaps the difference in the holding effectiveness attributable to a round head configuration in comparison with a straight T nail head configuration is overemphasized and has no practical existence in many applications, nevertheless, in some applications a difference in fastening effectiveness does exist. There are many factors other than head configuration which are determinative of the fastening effectiveness of any given nail. Nails are essentially used to secure two workpieces together and are usually driven through the first workpiece and into the second. The relative thickness of the first workpiece and the depth of penetration into the second with respect to the shank length is a highly critical factor in determining the fastening effectiveness of a nail. By providing shank surface configurations which are unsmooth or by providing shank coatings on smooth shanks the effectiveness of the shanks themselves to secure the two workpieces together can be greatly enhanced. The holding capabilities of the head of the nail becomes a more important factor in the fastening effectiveness as the thickness of the first workpiece decreases. Where the first workpiece is a relatively thin wooden board or the like, the position of the head of a T nail with respect to the grain of the wood can cause quite a variation in the fastening effectiveness. Where the T nail head is aligned with the grain, not only the tendency for pull through is increased, but there is a much greater tendency for splitting to occur. On the other hand, where the head of a T nail extends across the grain there is considerably less tendency for pull through an splitting. Of course, since there are no grain alignment problems with respect to round head nails, the holding effectiveness of such nails does not vary with respect to orientation. Thus, to this extent a round head nail can be regarded as providing a greater fastening effectiveness than a T nail.

There have been many proposals to construct a nail so as to have the packaging advantages of a T nail and at the same time retain to a considerable extent the fastening effectiveness of a round head nail. In general, these proposals have involved eliminating a side portion of the full round head so as to permit a multiplicity of such nails to be packaged in shank-to-shank abutting relation. The initial proposals were to simply provide a notch in the round head of a size appropriate to accommodate the shank therein. In later designs, the entire portion of one side of the round head was cut off along a straight line forming in essence a D shaped nail. Such proposals have not received widespread acceptance.

These constructions, as well as conventional T nails and round head nails, all provide disadvantages in terms of the driving effectiveness within the tool. A round head nail probably presents the greatest problem of driving effectiveness for the reason that the drive track of the tool must have a cross-sectional configuration of a size sufficient to accommodate the full round head and consequently it is not possible to provide stationary structure within the guide track which is capable of guidingly contacting the shank during its driving movement. Various movable guiding arrangements have been proposed but such arrangements ultimately have a detrimental effect on the driving action. Where no movable guide arrangement is provided, there exists a distinct possibility that the shank of the nail will become misaligned with the axis of the drive track, thus diminishing the driving effectiveness and giving rise to the possibility of jamming.

The D head nail construction provides some measure of control of the nail shank during the driving movement, specifically by the abutting engagement of the shank of the next adjacent nail. However, it will be noted that the D head nail, like the round head nail, has a drawback in driving effectiveness due to the lapped relation of the head of the next adjacent nail over the head of the nail being driven. Because of this overlapping relationship which extends above a portion of the shank itself, the shape of the driver must be relieved so as to avoid contact with the overlapping head of the next adjacent nail. This circumstance results in the driver impact being applied to the head in an offset relationship with respect to both the head area and the shank axis which diminishes the driving effectiveness. The detrimental effect of misalignment at driver impact has been diminished somewhat by shaping the drive track to cam the nail into alignment during the driving movement. However, this camming action results in less driver to nail head contact area and also gives rise to the possibility of jamming.

The driving effectiveness of a T nail does not present the difficulties of head overlap and provides a measure of shank control during driving which is greater than either the D head or full round head nail. Thus, with a T nail, in addition to the guiding contact of the shank of the next adjacent nail, the drive track can have a stationary structure which guidingly contacts the shank in diametrically opposed relation. However, such two-line guiding contact with the shank does not positively prevent misalignment of the shank in the other two directions.

It is an object of the present invention to provide a nail which, from a packaging standpoint, achieves the advantages of a T nail in terms of density and facility of securement and eliminates the disadvantages in this regard of a round head nail, from a fastening effectiveness standpoint achieves substantially the advantages of a round head nail without thte disadvantages of a T nail and from a driving effectiveness standpoint achieves advantages in terms of shank guiding control which can not be obtained either with a T nail or a round head nail.

Another object of the present invention is the provision of a nail capable of achieving all of the advantages mentioned above which, from a driving effectiveness standpoint, achieves the additional advantage of a T nail in terms of shank-to-driver element alignment and eliminates the disadvantage in this regard of a round head or D head nail.

Another object of the present invention is the provision of a nail capable of achieving all of the advantages mentioned above which, from a packaging effectiveness standpoint, achieves the additional advantage of a T nail in terms of versatility of package configuration and eliminates the disadvantages in this regard of a round head or D head nail.

A further object of the present invention is the provision of a nail of the type described which can be economically manufactured on existing nail making equipment with very slight modification and which can be handled economically with simple packaging equipment.

These and other objects of the present invention will become more apparent during the course of the following detailed description and appended claims.

The invention can best be understood with reference to the accompanying drawings wherein illustrative embodiments are shown.

In the drawings:

FIG. 1 is a perspective view of the preferred form of nail embodying the principles of the present invention;

FIG. 2 is a side elevational view of a preferred nail package embodying a multiplicity of nails constructed as illustrated in FIG. 1; and FIG. 3 is an enlarged fragmentary top plan view taken along the line 3—3 of FIG. 2.

Referring now more particulary to FIG. 1 of the drawings, there is shown therein a preferred nail generally indicated at 20, which embodies the principles of the present invention. In general, the nail includes an elongated shank 22, a workpiece entering point 24 formed on one end thereof and four head elements 26 extending outwardly from the opposite end thereof.

As shown, the shank 22 is formed with a smooth cylindrical peripheral surface except for the conventional nail making machine marks, indicated at 28, which preferably are disposed in a position on the shank only beneath the opposite head elements 26. It will be understood, however, that it is within the principles of the present invention to utilize a shank construction which presents a peripheral configuration other than a smooth cylindrical surface. For example, the term substantially cylindrical surface, as herein used, includes a cylindrical surface of the periphery of the shank which is interrupted, as by serrations or the like, to provide for greater holding effectiveness in accordance with conventional practice. As shown, the point 24 is of conventional construction and here again, it will be understood that it is within the principles of the present invention to utilize other work penetrating configurations including those of well-known and conventional design. As shown, each of the head elements 26 is of generally straight configuration in plan and extends radially outwardly from the associated end of the shank 22 in angular relationship with respect to the other of approximately 90°.

With the above specific nail construction in mind, it will be understood that various changes in the shape of the head elements and their interrelationship can be made so long as such changes do not depart from certain essential characteristics which are in accordance with the principles of the present invention. These characteristics are considered essential in order to accomplish the objective of providing a nail construction which, from a packaging standpoint, achieves the advantages in terms of density of a T nail and eliminates the disadvantages of a round head nail, from a fastening effectiveness standpoint achieves substantially the advantages of a round head nail without the disadvantages of a T nail and from a driving effectiveness standpoint achieves advantages in terms of shank guiding control which cannot be obtained either with a T nail or a round head nail.

These advantages are achieved by virtue of the relationship of the configuration of the head elements to the configuration of the shank and can best be expressed and understood in terms of the projection of the periphery of the head elements in the direction of extent of the shank in relation to the periphery of the shank. Since these three dimensional configurations do not vary substantially in the longitudinal direction, the relationships between the configurations can be conventionally depicted in twodimensional form by viewing the nail construction in plan, as in FIG. 3.

With reference to FIG. 3, and more particularly the middle nail 20 shown therein, the periphery of the shank 22 is represented by the partially broken circular line 34. The projection of the periphery of the head elements 26 is represented by the four lines indicated at 36, the left-hand two of which are solid and the right-hand two of which are partially broken, all of which are disposed outwardly of the circular line 34.

Package effectiveness is achieved by maintaining the projection of the periphery of the head elements outside of an endless plane of a size and shape equal to the size and shape of the shank periphery, which endless plane is disposed in substantial parallel abutting engagement with the periphery of the shank substantially along a longitudinal line contained within the plane of the shank periphery. With reference to FIG. 3 and more particularly to the right-hand nail 20 shown therein, the above-mentioned endless plane is represented by the partially broken circular line indicated at 42 and the above-mentioned longitudinal line is represented by the point indicated at 44.

This relationship insures that a multiplicity of nails embodying the present construction can be disposed in correspondingly head oriented parallel relation with the shanks of adjacent nails in substantial abutting engagement as shown in FIG. 2, thereby providing a package effectiveness both in terms of density and facility of securement which is equal to that provided by T nails and eliminating the disadvantages in this regard presented by round head nails.

Fastening effectiveness is achieved by maintaining the aforesaid projection at least partially outside of any two parallel planes tangential to the periphery of the shank. Again, referring to FIG. 3, two pairs of exemplary parallel planes are represented by two pairs of lines. The first pair is indicated at 58 and 60, the line 58 containing the point 44. The second pair of lines is indicated at 62 and 64 and is disposed essentially perpendicular to the lines 58 and 60.

As is evident from FIG. 3, this relationship insures that the head elements, when engaged with a workpiece, will have at least a portion thereof which extends outside an area defined by two such parallel planes oriented in any particular direction with respect to the workpiece, such as in the direction of the grain in a wood workpiece, irrespective of the orientation of the head elements with respect to the workpiece. Thus, the tendency for head pull-through and splitting resulting from head-grain alignment, as with a T nail, is eliminated.

Driving effectiveness is obtained by maintaining the aforesaid projection of the head elements outside of a plurality of additional longitudinal lines contained within the plane of the shank periphery, which additional longitudinal lines are disposed in circumferentially spaced relation with respect to each other and with respect to the first-mentioned longitudinal line (represented by point 44) such that a plurality of straight planes, each containing one of the longitudinal lines and disposed tangentially to the periphery of the shank presents outwardly facing surfaces having directional components in all four directions.

Again, referring to FIG. 3, there are three additional longitudinal lines in addition to the longitudinal line represented by the point 44. These three lines are represented by the three points indicated at 78, 80 and 82. As shown, the longitudinal lines represented by the points 44, 78, 80 and 82 are contained respectively within the straight planes represented by the lines 58, 62, 60 and 64. Each line and its contained point has a directional arrow associated therewith designating a component direction. The directional arrow associated with the point 44 and line 58 is indicated at 84 and extends to the right in the drawing. The directional arrow associated with the point 78 and line 62 is indicated at 86 and extends upwardly. The directional arrow associated with the point 80 and line 60 is indicated at 88 and extends to the right. The directional arrow associated with the point 82 and line 64 is indicated at 90 and extends downwardly.

As can be seen from FIG. 3, this relationship insures that when the nail is impacted and driven longitudinally outwardly of the drive track of the tool, the drive track can have stationary longitudinally extending surfaces for guidingly engaging the periphery of the shank at positions corresponding to the longitudinal lines during such driving movement. The guiding engagement of these stationary drive track surfaces together with the guiding engagement of the shank of the next adjacent nail insure guiding control of the shank in all four component directions substantially throughout the entire driving movement of the nail outwardly of the drive track, thus positively eliminating misalignment and the jamming problems which may result therefrom.

In addition to the above-mentioned essential characteristics, it will be noted that the nail form includes a preferred arrangement which achieves, from a driving effectiveness standpoint, the additional advantage of a T nail in terms of shank-to-driver element alignment and eliminates the disadvantages in this regard of a round head or D head nail.

In accordance with the principles of the present invention, the additional driving effectiveness is achieved by maintaining the shape of the head elements such that the aforesaid projection lies outside of a second endless plane of a size and shape equal to the aforesaid endless plane (represented by partially broken circular line 42) and shank periphery, which second endless plane is disposed in substantial parallel abutting engagement with the periphery of the shank substantially along a longitudinal line contained within the plane of the shank periphery which is in opposite alignment with respect to the first-mentioned longitudinal line (represented by the point 44). With reference to FIG. 3, and particularly the left-hand nail 20 shown therein, the second endless plane is represented by the partially broken circular line indicated at 96 and the longitudinal line is the same as the longitudinal line represented by the point 80.

It can thus be seen that by considering the left-hand nail illustrated in FIG. 3 as being disposed within the drive track, the head elements of the next adjacent nail would not physically prevent downward access to the nail head within the drive track by a fastener driving element which is concentric with and of a size equal to the shank periphery. Moreover, the fastener driving element can have a cross-sectional shape which will contact at least two head elements. This fastener driving element shape insures that there will be adequate strength built into the driver thus minimizing the possibility of driver failure.

It will be noted by reference to FIG. 2 that the head elements must be disposed in overlapping relationship resulting in a stepped relationship of the row formation which extends upwardly and rearwardly at an angle. As shown in FIG. 2 the angle is approximately 40° and it will be understood that the magazine assembly of the tool in order to accommodate such package must likewise extend upwardly and rearwardly from the drive track at a comparable angle.

The nail package shown in FIG. 2 is of the straight stick type and the nails can be retained in the relationship shown by any suitable means. As shown, an adhesive material such as that conventionally employed in adhering staples in stick formation is utilized as the securing means. While the nails of the present invention have particular advantages when packaged in straight stick formation, it will be understood that they are equally susceptible to being packaged in other forms as, for example, in coils or the like utilizing other securing means. In this regard, see for example U.S. Pat. No. 3,083,369 dated Apr. 2, 1963. With respect to coil packages, the preferred nail construction 20 would permit coiling of the nails with their shanks spaced in substantially closer relation with respect to each other than the full round head nails illustrated in the coil of the aforementioned patent. A coiled shank-to-shank abutting package arrangement would be possible with the nail 20 so long as the lapped relationship of the adjacent head elements is maintained.

With the above in mind, it will be understood that the shape of the head elements and the shape of the shank periphery is susceptible to considerable variation in accordance with the principles of the present invention. The straight configuration of the head elements shown in the drawings and described above is preferred for the reason that this shape can most conveniently be produced by existing nail making equipment with very little modification. The width of each head element adjacent the shank is preferably made as great as possible within the parameters described above, taking into account manufacturing tolerances. The limitations of existing nail making equipment also determine to a considerable extent the preferred thickness and length of the head elements as shown. That is, in existing nail making equipment, the head elements are formed by cold flow of the metal forming the upper part of the shank and the amount of metal which can be effectively made to cold flow is limited. Consequently, where the advantages of using slightly modified existing nail making equipment are achieved the straight filletted configuration with the maximum lengths and thicknesses shown is preferred.

It is recognized, however, that nail making machines which are not so inherently limited could be developed to form head elements with curved or angular profiles which embody the principles of the present invention. In general, however, it can be stated that the strength of each head element is determined to a considerable extent by the amount of metal contained therein at its juncture with the shank, so that an outwardly increasing width or thickness would not provide any appreciable increase in the head holding ability of the nail.

A nail embodying the principles of the present invention has the advantages mentioned above throughout the full size range, the advantages being particularly desirable in the larger size nails.

For example, a 16d nail embodying the principles of the present invention can have a smaller shank diameter than a standard 16d common nail, since it is power driven and the shank is controlled throughout the power driven movement. Thus, it is not necessary to build in strength in the shank which will resist bending under the action of a hand-held hammer. The holding ability of the nail, even though of smaller shank diameter, can be made equally effective either by interrupting the smooth cylindrical surface or preferably by providing a coating thereon. Significant savings in material costs can thus be obtained by the nail of the present invention, particularly the larger sizes.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. A nail comprising a length of metal wire defining an elongated shank having a first end portion formed into a workpiece entering construction and a second end portion formed by cold flow of metal into a head construction consisting of four head elements extending radially outwardly of said shank in equally annularly spaced relation of generally 90°, each of said head elements being joined with a circumferentially coextensive peripheral portion of the shank which has an angular extent of less than 90°, each head element having a width measured in a direction perpendicular to its radial extent at a position adjacent to but radially outwardly of its coextensive portion of the shank periphery which is less than the greatest thickness of said shank measured in the same direction as the associated width measurement, the shank periphery including four convexly arcuate circumferential portions interposed between the four portions circumferentially coextensive with the width of said four head elements.

2. A multiplicity of nails as defined in claim 1 arranged in correspondingly head oriented parallel relation with two of the convexly arcuately peripheral portions of the shanks of adjacent nails in substantial abutting engagement and with two leading head elements of each nail in overlapping relation with two trailing head elements of the forwardly adjacent nail, and means for retaining said multiplicity of nails in said arrangement.

* * * * *